United States Patent [19]
Bell

[11] 3,767,966
[45] Oct. 23, 1973

[54] AUTOMATIC HEADLIGHT CONTROL SYSTEM FOR AUTOMOBILES

[76] Inventor: Robert L. Bell, 5990 N.E. 18th Ave., Fort Lauderdale, Fla. 33308

[22] Filed: July 6, 1972

[21] Appl. No.: 269,443

[52] U.S. Cl.................. 315/83, 307/10 LS, 340/76
[51] Int. Cl.............................................. B60q 1/04
[58] Field of Search............................. 315/82, 83; 307/10 LS; 340/76

[56] References Cited
UNITED STATES PATENTS
3,600,596   8/1971   Azuisantoni.................... 315/82 X Primary Examiner—Roy Lake
Assistant Examiner—James B. Mullins
Attorney—Ernest H. Schmidt

[57] ABSTRACT

An electrical automobile headlight control device in modular form adapted for convenient interconnection with the electrical circuitry of automotive vehicles and serving as an automatically operating auxiliary device for appropriate control of the vehicle running lights under various conditions of vehicle operation is described. The electrical circuitry of the module is adaptable, by selective connection, to use in vehicles having accessory potential returned either to positive or negative vehicle battery, and includes means not only for automatically energizing the vehicle running lights upon the manually switching on of the vehicle windshield wipers but, as a principal feature, a memory means for retaining the running lights in operating condition until such time as the operator effects an additional manual control or adjustment, thereby preventing automatic turnoff of the vehicle running lights when needed for safe driving even after previous manual turning off of the windshield wiper switch.

9 Claims, 1 Drawing Figure

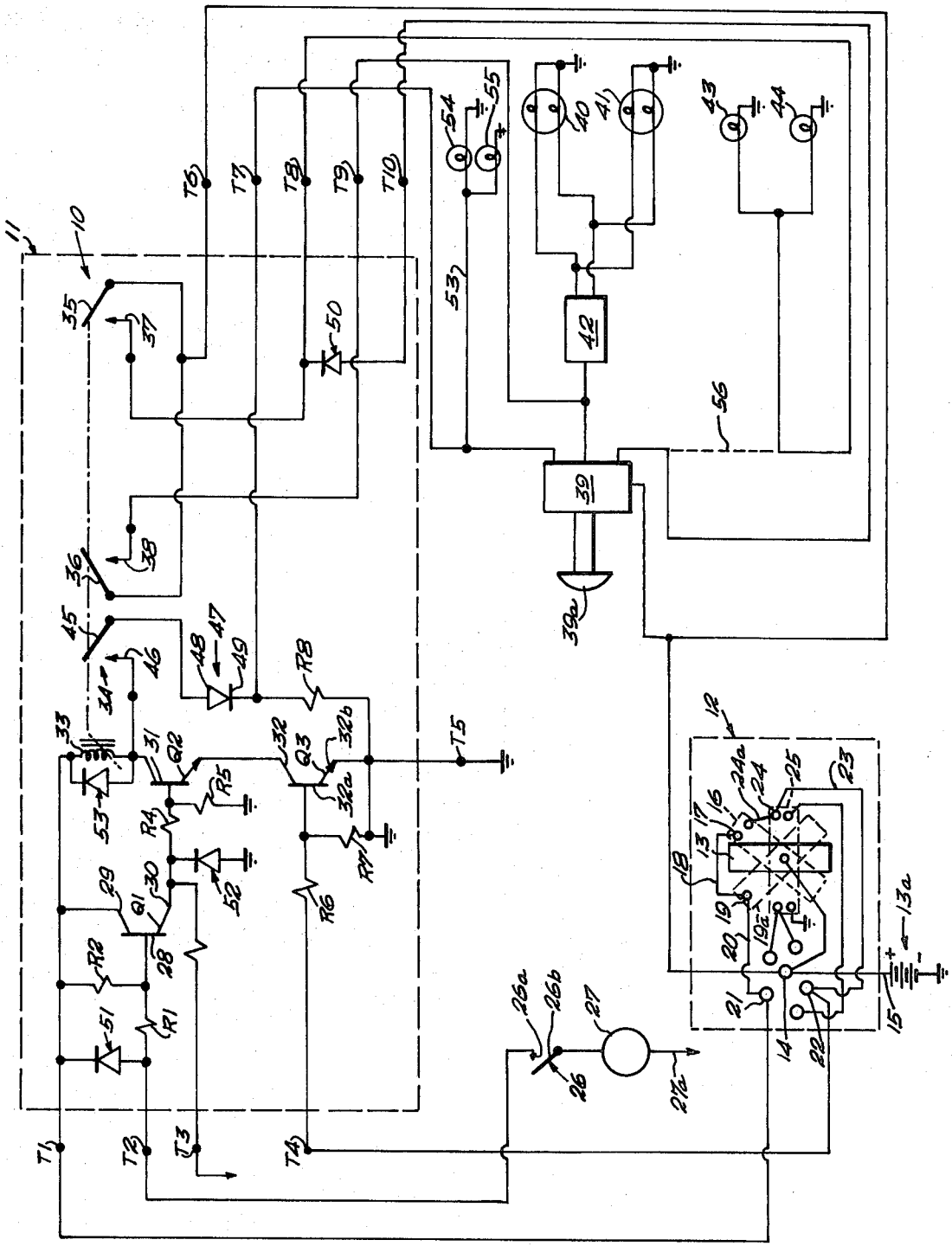

AUTOMATIC HEADLIGHT CONTROL SYSTEM FOR AUTOMOBILES

This invention relates to automotive vehicle headlight energizing circuitry and is directed particularly to an auxiliary device adapted to be connected into the electric wiring of an ordinary automotive vehicle and operative to automatically turn the lights of the vehicle on upon manually switching on the windshield wipers, while at the same time providing for automatically turning the headlights off under various appropriate conditions controlled by operation of the usual lighting switch or the vehicle ignition switch.

It is good driving practice and even required by law in many states, to operate the headlights or running lights of an automotive vehicle at the same time during daylight hours that operation of the windshield wipers may be required while driving through rain, snow or fog. Because it is easy to forget to turn the headlights on after placing the windshield wipers in operation during daylight hours, various electronic and electromechanical devices have heretofore been devised to automatically effect the turning on of automotive vehicle headlights simultaneously with the switching on of the windshield wipers. Such devices heretofore known, however, are deficient in various respects, principally in that while they are operative to turn the headlights on upon actuation of the windshield wiper switch, they also operate automatically to turn off the headlights upon subsequent operation of the windshield wiper switch to the off position.

If the headlights are controlled by operation of the windshield wipers during daylight, and thereafter the windshield wipers are switched off after sundown, the headlights of vehicles of such prior art controlling devices will be turned off at the same time. Such operation, obviously, can be most hazarouds, particularly while driving through heavy traffic at night under poorly lights or unlighted road conditions.

It is, accordingly, the principal object of this invention to provide an automatic headlight control system of the above nature including an electronic memory system operative to retain the headlights in an energized condition even after manual deenergization or switching off of the windshield wipers until such time as the operator subsequently actuates the main headlight switch, thereby obviating the possibility of inadvertently de-energizing or turning off the headlights at an inopportune time after sundown.

Another object of the invention is to provide an automative headlight control system for automobiles which will not automatically energize the headlights upon switching on the windshield wipers if the ignition switch is in the accessory position, thereby providing the use of the windshield wipers without at the same time energizing the headlights, such as may be desirable in a drive-in theater during rain showers.

Yet another object of the invention is to provide an automatic headlight control system of the character above-described which includes connection means accommodating use with automotive vehicles having either positive voltage or a gound connection, made when the windshield wiper switch is closed, thereby rendering it universally applicable to substantially all cars of American manufacture.

Still another object of the invention is to provide an automatic headlight control system for automotive vehicles in the form of an integrated module housed in a rugged encapsulated structure and having a plurality of connector leads readily connectable in the existing electrical circuitry of an automotive vehicle, whether of the positive or negative grounded battery type, to provide for automatic control of the headlights as is hereinbelow more particularly described.

Yet another object of the invention is to provide an integrated module of the above nature which will be compact in size, easy to install, economical to manufacture, fool-proof in operation and reliable in use.

Other objects, features and advantages of the invention will be apparent from the following description when read with reference to the accompanying drawing, the single FIGURE of which is an electrical schematic diagram of the system showing its interconnection with pertinent circuitry of an automotive vehicle in a typical installation.

Referring to the drawing, reference numeral 10 designates schematically the electrical circuitry of the automatic headlight control system embodying the invention, said circuitry preferably being encapsulated in potting material to provide a rigid modular unit indicated by the broken-line representation thereof designated by reference numeral 11. The module 11 comprises integrated solid state circuitry and an electrical power relay controlled by the solid state circuitry and being operative to effect switching of the electrical circuitry of the vehicle in which the device is connected, as is hereinbelow more particularly described. Extending outwardly of the modular unit 11 for interconnection with the internal circuitry thereof are in plurality of pig-tail connector leads T1, T2, T3, T4, T5, T6, T7, T8, T9, and T10, used for interconnection with the electrical circuitry of the vehicle in which the device is to be installed, as is hereinbelow more particularly described.

Considering now the detailed operation of the automatic headlight control system, reference numeral 12 designates, in pictorial representation, a typical automotive vehicle ignition switch, and shows interconnection thereto of connection leads T1, T4 and T6 of the integrated circuitry of the modular unit 11. The vehicle switch 12 typically is key-actuated and comprises a rotary electrical connector member 13, normally in "off" position as indicated by the full-line representation thereof, which connector member 13 is connected with the undergrounded battery terminal of vehicle battery 13a through battery switch terminal 14 and conductor 15. Upon insertion of the ignition key, when the rotary connector member 13 is turned clock-wisely to the position indicated by the broken-line representation thereof designated by reference numberal 16, battery will be connected through said rotary member, switch contact member 17, conductor 18, switch contact member 19, conductor 20 and accessory switch terminal 21 to connector lead T1 of the modular 11 unit comprising the invention. At the same time, connector lead T4 of the integrated circuitry of the modular unit 11 will be connected through ignition switch terminal member 22, conductor 23, ignition switch contact 24, switch jumper conductor 24a and rotary switch contact member 13 of said ignition switch to the positive terminal of vehicle battery 13a. With such electrical interconnection of the connector leads T1 and T4 of the modular circuitry, positive battery potential is simultaneously applied to both of said connector leads to place the automatic control circuitry of the module into a ready condition, as is hereinbelow more particularly described.

At this point in the consideration of the operation of the automatic control afforded by the integrated circuitry comprising the modular unit 11 embodying the invention, it is to be noted that the module circuitry will always be de-energized and inoperative whenever the vehicle engine is being cranked by the starter motor for placing the engine into operating condition for the following reason. When the ignition key is turned further in the clock-wise direction into the coil and start position indicated by the broken-line representation thereof designated by reference numeral 25, both the ignition coil of the vehicle and the starter motor will be energized to place the engine in operation. Since automotive vehicle ignition and starting motor circuitry operated by a key-actuated ignition switch is well known, and because such circuitry forms no part of the present invention, circuit details thereof are omitted as deemed unnecessary for proper understanding of the present invention. It need be noted only that when the rotary member 13 of the ignition switch is turned to start position, as represented by the dotted-line position thereof indicated at 25, battery connection to the switch contact member 17 is open-circuited for as long a period of time as the engine is being cranked by the vehicle starter, and battery potential will be removed from module connector lead T1 to prevent automatic operation of the device even with the windshield wiper switch in closed position.

Considering now the operation of the electronic circuitry of the automatic control device when the ignition switch is in "on" position, that is, in the position indicated by the broken-line representation thereof designated by reference numeral 16, it will be understood as described above that battery potential will be applied to both of the interconnection leads T1 and T4 of the unit module 11 comprising the invention and interconnected in the vehicle circuitry.

Reference numeral 26 designates the normally open, single-pole, single-throw electrical switch controlling operation of the vehicle wipers, comprising a fixed contact member 26a and a movable switch contact member 26b. One of the switch contact members, movable switch contact member 26b in the embodiment illustrated, is returned either to plus 12 volt battery or to chassis ground, depending upon the particular grounding system used in the vehicle in which the automatic control device module 11 comprising the invention is connected. Assuming first that the vehicle in which installation is made has ground return through energizing conductor 27a rather than 12 volt positive battery return for the windshield wipers indicated at 27, module connector lead T2 will be connected directly to the remaining energizing switch terminal 26a of the manually controlled electrical windshield wipers switch 26. When the ignition switch 12 is turned to "on" position as represented at 16 as described above, and upon manual switching on of the wipers switch 26 to effect operation of the windshield wipers, ground potential will be applied to wiper switch energizing contact member 26b through now-connected conductor lead T2 to permit operation of the windshield wipers and energization of the vehicle headlights under the following conditions. Transistor Q1 which is normally non-conducting, turns on or begins to conduct because of negative or ground potential being applied to its base element 28 through resistors R1 and R2, said resistors operating as a voltage divider returned to battery positive through module connector lead T1 as described above. When the transistor Q1 is thus turned on, it saturates so as to supply positive 12 volt battery through connector lead T1 from the accessory terminal 21 of the ignition switch 12 and through emitter element 29 of transistor Q1 to resistors R4 and R5 connected in series between the collector 30 of the said transistor and vehicle ground potential, said ground connection being made through common ground module connector lead T5. The series-connected resistors R4 and R5 also serve as a voltage divider device supplying a positive voltage to base element 31 of transistor Q2, which is normally nonconducting, thereby to effect saturation and conduction. With transistor Q2 thus biased into conduction, series connected transistor Q3, which is normally non-conductive, also turns on because of positive potential being applied to the collector element 32 of said transistor through the energization coil 33 of switching relay 34, and now conducting transistor Q2. In this connection it is to be noted that the base element 32a of transistor Q3 is supplied with positive bias potential by resistors R6 and R7 connected in series and serving as a voltage divider connected between positive voltage supplied through module connector lead T4 as described above and vehicle ground through vehicle ground return module connector lead T5; and that the emitter element 32b of transistor Q3 is returned to ground through module connector lead T5. With both transistors Q2 and Q3 being saturated or in conducting condition, current from the vehicle battery flows through energizing coil 33 of the power relay 34 to vehicle chassis ground through common ground module connector lead T5.

Upon energization of the power relay 34, its normally-open three-pole, single-throw switch elements close circuit, which connects common module connector lead T6 through movable switch contact arms 35 and 36 of said relay, and through fixed contact arms 37 and 38, respectively, of said relay to module connector leads T8 and T9. In the installation of the modular unit 11, the common module connector lead T6 will be connected directly to positive vehicle battery at switch contact 14 of ignition switch assembly 12. Closure of the relay contact sets 36, 38 thus supplies positive vehicle battery through connector lead T9 to the vehicle instrument panel headlight switch, indicated at 39, to which it is connected in installation for supplying positive battery directly to the vehicle headlights 40 and 41 through the usual foot operated dimmer switch 42. At the same time, closure of the relay contacts 35, 37 supplies positive vehicle battery through module connector lead T8 to vehicle tail lamps 43, 44 for their energization simultaneously with the headlights as described above.

The remaining switch contact sets of the three-pole, single-throw switch assembly of the power relay 34, comprising movable contact arm 45 and fixed contact arm 46, is operative to close-circuit simultaneously with the relay headlamp and tail lamp automatic control switches described above, and comprises a circuit element of a memory circuit, hereinbelow described, for maintaining automatically controlled energization of the vehicle head lamps and tail lamps as described above even when the above-described manually-controlled electrical windshield wiper switch 26 of the associated vehicle is subsequently manually turned off. Thus, assuming that the windshield wiper switch 26 is turned off, potential is removed from module connector lead T2 and gate transistor Q2 turns off because the above-described current loop through accessory terminal 21, the ignition switch assembly 12 and the windshield wipers 27 will be open-circuited However, current continues to flow through now-closed power relay switch contact element 45, 46, through series-connected diode 47 comprising anode 48 and cathode 49, and through resistor R8, which resistor is returned to vehicle chassis ground through module connector lead T5. The relay 34 will thus remain latched, the resistance value of the resistor R8 being sufficient to supply the necessary energizing current to said relay under this condition of operation, which current produces a potential of approximately 6 volts at the cathode 49 of diode 47, assuming the vehicle battery to be the usual 12 volt type. Module connector lead T7 connected to the cathode 49, is, upon installation of the module, joined to the parking light energizing terminal of the headlight control switch 39. At this time during operation of the system, the vehicle ignition switch is on, the headlights and tail lights are on, and the windshield wipers are switched off, as described above.

Assuming now that the operator has not driven for a period of time from daylight to twilight or night driving conditions whereunder continuous operation of the headlights and tail lights is required after previously having manually turned off the windshield wiper switch 26, manual turning off of the headlights and tail lights can readily be accomplished simply by actuating the manual control member or knob 39a of the headlight switch 39 to parking light or headlight position temporarily, whereupon 12 volt positive battery will be applied to module connector lead T7 through the headlight switch. The biasing on the diode 47 will thereby be reversed, that is, its cathode 49 will become more positive than the anode 48, causing it to cease conducting and thereby open-circuiting the above-described energizing circuit to the power relay latching switch 45, 46. The switch 45, 46 will thus open, returning the power relay to its quiescent or de-energized condition, which simultaneously opens the vehicle lamp switches 35, 37 and 36, 38 for de-energizing or turning off the vehicle head lamps 40, 41 and tail lamps 43, 44.

If, instead of manually turning off the vehicle lamps as described above because their continued use was necessitated by night driving, upon finally stopping the vehicle by turning the ignition switch to off position, battery potential will be removed from module connector leads T1 and T4 so that both gate transistors Q1 and Q2 will be turned off or placed in non-conducting condition. Hence no potential is available as described above to energize the energization coil 33 of power relay 34, and the vehicle lamps will be de-energized.

Assuming next that the operator does not turn off the windshield wipers as described above and that the vehicle lights as well as the windshield wipers are operating, and further assuming that the operator wishes to park his car temporarily while he goes shopping in a supermarket, for example, he need only turn the ignition switch to "off" position to open-circuit the energizing connections to module connector leads T1 and T4, thereby effecting the turning off or open-circuiting of gate transistors Q1 and Q2, which have previously been activated or placed in conducting condition as described above. With transistors Q1 and Q2 turned off, potential will no longer be applied to the power relay 34, thereby removing its energizing current and open-circuiting its locked-in switch contacts 45, 46. De-energization of the power relay 34 automatically open-circuits the above-described energization circuits to the vehicle headlights and tail lights, turning them off. Upon return to the vehicle, assuming the windshield wiper switch 26 still to be on, as described above, the operator will turn the ignition switch to the "on" or running position indicated at 16 and the module circuitry will become energized again, as described above, to automatically turn the vehicle lights on along with automatic setting into operation of the windshield wipers. As described above, however, while the ignition switch 12 is temporarily turned to start position, represented by the broken-line representation thereof indicated at 25, potential to the module connector lead T1 will be removed for as long a period of time as required to start the engine, thereby preventing undue drain on the vehicle battery. Upon return of the ignition switch to "on" or running position again under the conditions just described, the module circuitry will become energized to effect continued operation of both the windshield wipers and the vehicle lights without the necessity for the operator to manually control the vehicle windshield wiper and vehicle lighting switches.

With the ignition switch 12 turned anti-clockwisely to the accessory only position, indicated by the broken-line representation thereof designated by reference numeral 19a, the automatic control module circuitry will not be operative because 12 volt battery will be removed from module connector lead T4, as described above. Upon manually turning on the wipers switch 26, transistor Q1 or Q2 will not turn on or saturate since series-connected transistor Q3 will be turned off for lack of positive battery potential being supplied to base element 32a thereof through now open-circuited module connector lead T4. With transistors Q2 and Q3 in turned-off position, no current can flow through the energizing coil 33 of power relay 34, leaving relay switch contact 45, 46 open and thereby preventing current flow through diode 47 and resistor R8. Thus, the windshield wipers 27 can be used when the ignition switch is in the accessory only position represented by reference numeral 19a, without the necessity of having the vehicle lights on at the same time. This feature of operation is desirable when rain showers occur while watching a moving picture at a drive-in theater, for example.

The diode 50 is provided to prevent malfunction of the modular unit circuitry in instances where the vehicle in which the device is to be installed has a common connection to the headlight switch 39 of the tail lights 43, 44 and parking lights 54,55. In such instances, with the headlights 40, 41 turned on by manual actuation of the vehicle headlight switch 39, the diode 50 functions merely to permit energizing current to flow through the headlight switch 39, connector lead T10, said diode and connector lead T8 to the tail lights. However, with the module circuitry operative as described above, that is, with the modular unit relay 34 in energized condition, the diode 50 blocks reverse current flow back to the headlight switch 39 through connector lead T10 and simultaneously to the front parking lights indicated at 54, 55 and interconnected modular unit connector lead T7. Otherwise, 12 volt positive battery would be applied to the cathode 48 of diode 49 which, as described above, would de-energize the latching energizing circuit for the control relay 34 of the modular unit rendering it inoperative and inadvertantly thereby de-energizing the vehicle lights.

If installation of the modular control unit is to be made in a vehicle wherein the parking lights and tail lights are not fed through a common conductor wire, the vehicle lighting wiring between the headlight switch 39 and the tail lights 43, 44 does not have to be opened, as indicated by the broken-line representation thereof at 56, and the connector lead T8 will be left unconnected. In such instances, only the modular unit connector lead T7 leading to the front parking light conductor 53 need be connected.

Diode 51 connected between the emitter 29 and base 28 of transistor Q1 in series with resistor R1 protects said transistor from damage due to reverse transients when the windshield wiper motor 27 and relay energizing coil 33 are switched off or de-energized during operation of the modular unit circuitry as described above. It has been determined that with installation made by connection of connector lead T2 in the energizing circuit of the vehicle windshield wiper by use of windshield wiper switch 26, a reverse voltage of approximately 400 volts is generated from the collapsing field of the windshield wiper motor. The diode 51 clamps this voltage to the 12 volt positive potential provided by the vehicle battery.

The diode 52 connected between ground and the base element of transistor Q2 through resistor R4 protects said transistor in instances wherein modular unit connector lead T3 is connected in the vehicle windshield wiper energizing circuitry, as is hereinbelow more particularly described. In such instances, when windshield wiper switch 26 is turned off, a reverse voltage of approximately 360 volts is generated from the collapsing field of the windshield wiper motor. The diode 52 serves to clamp such reverse voltage to ground, and thereby prevent damage to transistor Q2.

Diode 53 connected directly across the energizing coil 33 of modular unit control relay 34 serves as a suppressor for the collapsing field generated upon de-energization of said relay coil during operation of the device as hereinabove described. The diode 53 provides a low resistance path for the reverse electromotive field back to the 12 volts positive provided by the vehicle battery, whereat it is clamped at this potential to prevent damage to transistor Q2.

In the hereinabove described operation of the modular unit control circuitry, it was assumed that the vehicle in which installation was made was of the type having ground return through the energizing conductor 27a for the windshield wipers indicated at 27. If installation is to be made in vehicles having 12 volt positive battery return, module connector lead T3 will be connected directly to the energizing switch terminal 26a of windshield wipers switch 26 instead of connector lead T2 as illustrated and as described above. and connector lead T2 will not be used. Under such conditions, when the windshield wiper switch 26 is closed 12 volt positive battery will be applied to the base element 31 of transistor Q2 through series-connected resistors R3, R4 and R5, and resistors serving as a voltage divider. With transistor Q2 thus biased into conduction, transistor Q3 also turns on because of positive battery potential being presented to its collector from the accessory contact 21 of the ignition switch 12 through modular unit connector lead T1 and energizing coil 33 of control relay 34, as above-described in connection with the operation of the device when installed in a vehicle having ground return for the windshield wiper motor 27. Operation of the device is otherwise identical with the description given above for installations in which the vehicle wiring is such that the windshield wiper motor energizing return lead 27a is connected to chassis ground.

Although the invention is not limited to the particular module circuitry herein described, and modifications thereof in keeping with the spirit of the invention as defined in the appended claims will be apparent to those skilled in the art, the following values of circuit components are given by way of example:

| R1 | 1000 ohms | Q1 | type 2N5447 |
| R2 | 2200 Ohms | Q2 | type SKA1479 |
| R3 | 1000 Ohms | Q3 | type SKA1479 |
| R4 | 1000 Ohms | Diode 47 | type IN4001 |
| R5 | 2200 Ohms | Diode 50 | type IN1341 |
| R6 | 1000 Ohms | Diode 51 | type IN4001 |
| R7 | 2200 Ohms | Diode 52 | type IN4001 |
| R8 | 120 Ohms | Diode 53 | type IN4001 |

While I have illustrated and described herein only one form in which may invention can conveniently be embodied in practice, it is to be understood that this embodiment is given by way of example and not in a limiting sense. The invention, in brief, comprises all the embodiments and modifications coming within the scope and spirit of the following claims:

What I claim is new and desire to secure by Letters Patent is:

1. A device for controlling the operation of the operating lights of an automotive vehicle having headlights, parking lights and tail lights, one or more electrical windshield wipers, a vehicle battery and electrical circuitry including the vehicle battery, a manually controlled vehicle lighting switch for energizing the vehicle headlights, parking lights and tail lights, and a windshield wiper switch for manually switching on the windshield wipers, the vehicle circuitry further including a vehicle ignition switch having an "on" position for energizing the vehicle circuitry including the vehicle ignition system, an "off" position for de-energizing the vehicle ignition system and an "accessory" position for energizing accessory electrical devices energized through the ignition switch, the improvement comprising; auxiliary switch means connectable with the vehicle electrical circuitry for switching the vehicle headlights and tail lights on and off independently of the vehicle lighting switch, said auxiliary switch means normally being in open-circuit condition, circuit means connectable in series with the vehicle windshield wiper switch and operative to close-circuit said auxiliary switch means upon manual closure of the windshield wiper switch and thereby automatically simultaneously energize the vehicle headlights independently of the manually-controlled vehicle lighting switch, said auxiliary switch means comprising memory means automatically operative to retain said auxiliary switch means in close-circuited condition upon subsequent opening of said windshield wiper switch.

2. A control device as defined in claim 1 including means controlled by operation of said vehicle lighting switch to render said memory means inoperative to retain and switch auxiliary means in closecircuit condition.

3. A control device as defined in claim 1, wherein said circuit means connectable in series with said windshield wiper switch comprises a pair of connector leads selectively connectable in series with the windshield wiper switch to accommodate operation of the vehicle electrical circuitry in instances wherein the electrical windshield wipers are returned either to positive vehicle battery or vehicle chassis ground.

4. A vehicle control device as defined in claim 1, wherein said auxiliary switch means comprises an electromagnetic switching relay, a plurality of normally open electrical switches controlled by said switching relay, and connector leads extending from said plurality of switches and connectable in the vehicle electric circuitry for energizing the vehicle headlights, parking lights and tail lights.

5. A vehicle control device as defined in claim 4, wherein said memory means comprises latch circuit means controlled by one of said plurality of switching relay switches for actuating said switching relay, said latch circuit means having means including a connector lead connectable in the vehicle electric circuitry and operative to effect deactuation of said switching relay upon the application thereto of a predetermined battery potential.

6. A vehicle control device as defined in claim 5, wherein said latch circuit means potential is in the order of full vehicle battery potential, permitting connection to the vehicle lighting switch for applying controlling potential upon the manual switching on of said vehicle lighting switch.

7. A vehicle control device as described in claim 4 wherein said circuit means comprises an energization circuit for said electromagnetic relay, including a pair of connector leads connectable between the "accessory" terminal of the vehicle ignition switch and vehicle chassis ground.

8. A vehicle control device as defined in claim 7 wherein said circuit means comprises solid state circuitry including normally non-conductive solid state circuit elements controlled for conduction by manual closure of the windshield wiper switch.

9. A vehicle control device as defined in claim 8 wherein said auxiliary switch means, said electromagnetic relay and said solid state circuitry is encapsulated in a unitary modular structure, said connector leads extending outwardly of said modular structure.

* * * * *